US010245659B2

(12) United States Patent
Mao

(10) Patent No.: US 10,245,659 B2
(45) Date of Patent: Apr. 2, 2019

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Shohei Mao, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 163 days.

(21) Appl. No.: 15/320,882

(22) PCT Filed: Jun. 22, 2015

(86) PCT No.: PCT/JP2015/067893
§ 371 (c)(1),
(2) Date: Dec. 21, 2016

(87) PCT Pub. No.: WO2015/199031
PCT Pub. Date: Dec. 30, 2015

(65) Prior Publication Data
US 2017/0157685 A1 Jun. 8, 2017

(30) Foreign Application Priority Data
Jun. 27, 2014 (JP) .................................. 2014-132389

(51) Int. Cl.
*B23C 5/06* (2006.01)
*B23C 5/20* (2006.01)
(Continued)

(52) U.S. Cl.
CPC .............. *B23C 5/2213* (2013.01); *B23C 5/10* (2013.01); *B23C 5/109* (2013.01); *B23C 5/20* (2013.01);
(Continued)

(58) Field of Classification Search
CPC ... B23C 2200/203; B23C 5/109; B23C 5/207; B23C 5/2213; B23C 5/20
See application file for complete search history.

(56) References Cited

U.S. PATENT DOCUMENTS 9,908,184 B2 * 3/2018 Ishi ......................... B23C 5/207
2012/0009029 A1 * 1/2012 Saji ......................... B23C 5/109
407/67

(Continued)

FOREIGN PATENT DOCUMENTS

EP 2415544 A1 2/2012
JP 2004-195563 A 7/2004
(Continued)

OTHER PUBLICATIONS

International Search Report (Form PCT/ISA/210) dated Sep. 8, 2015, issued for PCT/JP2015/067893.
(Continued)

*Primary Examiner* — Sara Addisu
(74) *Attorney, Agent, or Firm* — Volpe and Koenig, P.C.

(57) ABSTRACT

A cutting insert has: first sub cutting edges at positions corresponding to first corner portions of a polygonal top surface; second sub cutting edges at positions corresponding to second corner portions; and main cutting edges on side portions. In a side view, each of the main cutting edges has a first cutting edge adjacent to the first sub cutting edge, a second cutting edge adjacent to the second sub cutting edge, and a third cutting edge between the first cutting edge and the second cutting edge. Each of the main cutting edges inclines such that the height thereof decreases from a portion adjacent to the first sub cutting edge to a portion adjacent to the second sub cutting edge. An inclination angle of the third cutting edge is greater than inclination angles of the first cutting edge and the second cutting edge.

17 Claims, 10 Drawing Sheets

(51) Int. Cl.
*B23C 5/22* (2006.01)
*B23C 5/10* (2006.01)
(52) U.S. Cl.
CPC ...... *B23C 5/207* (2013.01); *B23C 2200/0438* (2013.01); *B23C 2200/083* (2013.01); *B23C 2200/203* (2013.01)

(56) References Cited

U.S. PATENT DOCUMENTS

| | | | |
|---|---|---|---|
| 2016/0158854 A1* | 6/2016 | Ishi | B23C 5/207 409/131 |
| 2017/0008099 A1* | 1/2017 | Touma | B23C 5/109 |
| 2017/0197259 A1* | 7/2017 | Kumoi | B23C 5/207 |
| 2017/0282262 A1* | 10/2017 | Burtscher | B23C 5/207 |
| 2017/0291231 A1* | 10/2017 | Mao | B23C 5/207 |

FOREIGN PATENT DOCUMENTS

| | | | |
|---|---|---|---|
| JP | 2009-208172 A | | 9/2009 |
| JP | 2009208172 A | * | 9/2009 |
| WO | 2010/114094 A1 | | 10/2010 |

OTHER PUBLICATIONS

Written Opinion (Form PCT/ISA/237) dated Sep. 8, 2015, issued for PCT/JP2015/067893.

* cited by examiner

CUTTING INSERT, CUTTING TOOL, AND METHOD FOR MANUFACTURING MACHINED PRODUCT

TECHNICAL FIELD

An aspect of the present invention relates to a cutting insert, a cutting tool, and a method for manufacturing a machined product.

BACKGROUND ART

Examples of a cutting insert (hereinafter also simply referred to as "insert") used for cut processing a work material, such as a metal, include a cutting insert disclosed in Japanese Unexamined Patent Application Publication No. 2004-195563A (Patent Document 1) and WO/2010/114094 (Patent Document 2). The insert disclosed in Patent Document 1 has first cutting edges whose height becomes gradually lower toward corner portions. The first cutting edge has a linear shape when viewed from a side. The insert disclosed in Patent Document 2 has first corner cutting edges that function as first sub cutting edges, second corner cutting edges, and main cutting edges located between these corner cutting edges. The first corner cutting edge functions as a bottom cutting edge. When attached to an end mill main body (holder), the second corner cutting edge is located on an outer periphery side of the end mill main body and functions as an auxiliary cutting edge.

With the insert disclosed in Patent Document 1, since the first cutting edge has the linear shape when viewed from a side, when the first cutting edge bites into the work material, sometimes the whole of the first cutting edge simultaneously comes into contact with the work material. In this case, a problem arises in which chatter vibration easily occurs because a load exerted on the first cutting edge changes rapidly.

With the insert disclosed in Patent Document 2, the main cutting edge is formed such that the height thereof increases more as the main cutting edge becomes separated from the first corner cutting edge. Thus, chips cut by the main cutting edge flow so as to become trapped inside the holder. Even in this case, in surface milling and shoulder machining, the chips can be favorably discharged outside. However, in the case of groove machining, a discharge direction of the chips is limited to the opposite side to a travel direction (feed direction) of a cutting tool. Thus, the chips that flowed so as to be trapped inside the holder cannot be favorably discharged, and if the main cutting edge makes contact once more with the work material in the state in which the chips are trapped, the chips may become caught between the main cutting edge and the machined surface of the work material.

In light of the foregoing, it is an object of an aspect of the present invention to provide a cutting insert capable of performing stable cut processing and also capable of discharging chips in a stable manner.

SUMMARY OF INVENTION

A cutting insert based on an aspect of the present invention includes a top surface including a side portion, and a first corner portion and a second corner portion each adjacent to the side portion; a bottom surface opposite to the top surface; a side surface located between the top surface and the bottom surface; and a cutting edge disposed along a ridge line at an intersection between the top surface and the side surface.

The cutting edges includes a main cutting edge located on the side portion, a first sub cutting edge located on the first corner portion, and a second sub cutting edge located on the second corner portion. In a side view, the main cutting edge has a first cutting edge having a linear shape and being adjacent to the first sub cutting edge, a second cutting edge having a linear shape and being adjacent to the second sub cutting edge, and a third cutting edge having a linear shape and located between the first cutting edge and the second cutting edge, and the main cutting edge inclines with a height thereof decreasing from a portion adjacent to the first sub cutting edge to a portion adjacent to the second sub cutting edge. Further, in a side view, an inclination angle of the third cutting edge is greater than inclination angles of the first cutting edge and the second cutting edge.

DESCRIPTION OF EMBODIMENT

Cutting Insert

Figure 1:
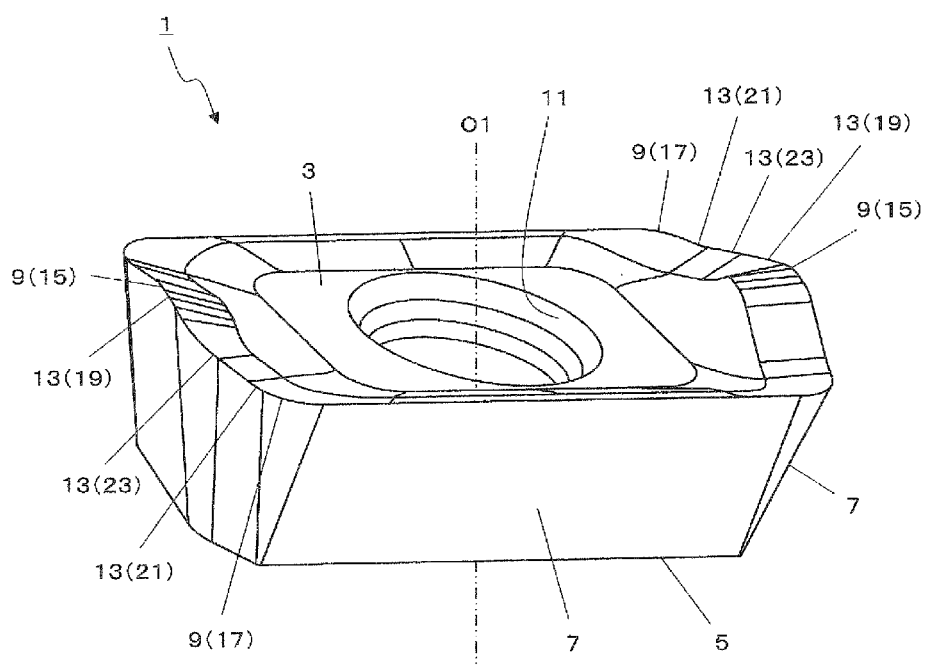
FIG. 1 is a perspective view illustrating a cutting insert of an embodiment of the present invention.

The following describes in detail a cutting insert of an embodiment with reference to the drawings. It should be noted that, for ease of explanation, each of the drawings referenced below are simplified drawings illustrating, among the constituent members of the embodiment, only the main parts required for describing the present invention. Accordingly, the cutting insert of the present invention may be provided with any constituent member which is not illustrated in each of the referenced drawings. Further, the dimensions of the members in the drawings do not faithfully represent the actual dimensions of the constituent members, the dimension ratios of the members, or the like.

A cutting insert 1 (hereinafter also simply referred to as "insert 1") of the present embodiment includes a top surface 3, a bottom surface 5, side surfaces 7, cutting edges 9, and a through-hole 11, as illustrated in FIGS. 1 to 5. Examples of the material of the insert 1 include cemented carbide alloy, cermet, or the like.

Examples of the composition of the cemented carbide alloy include, for example, WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound, such as titanium carbide (TiC) or titanium nitride (TiN), is the main component.

The surface of the member described above configuring the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

Figure 2:
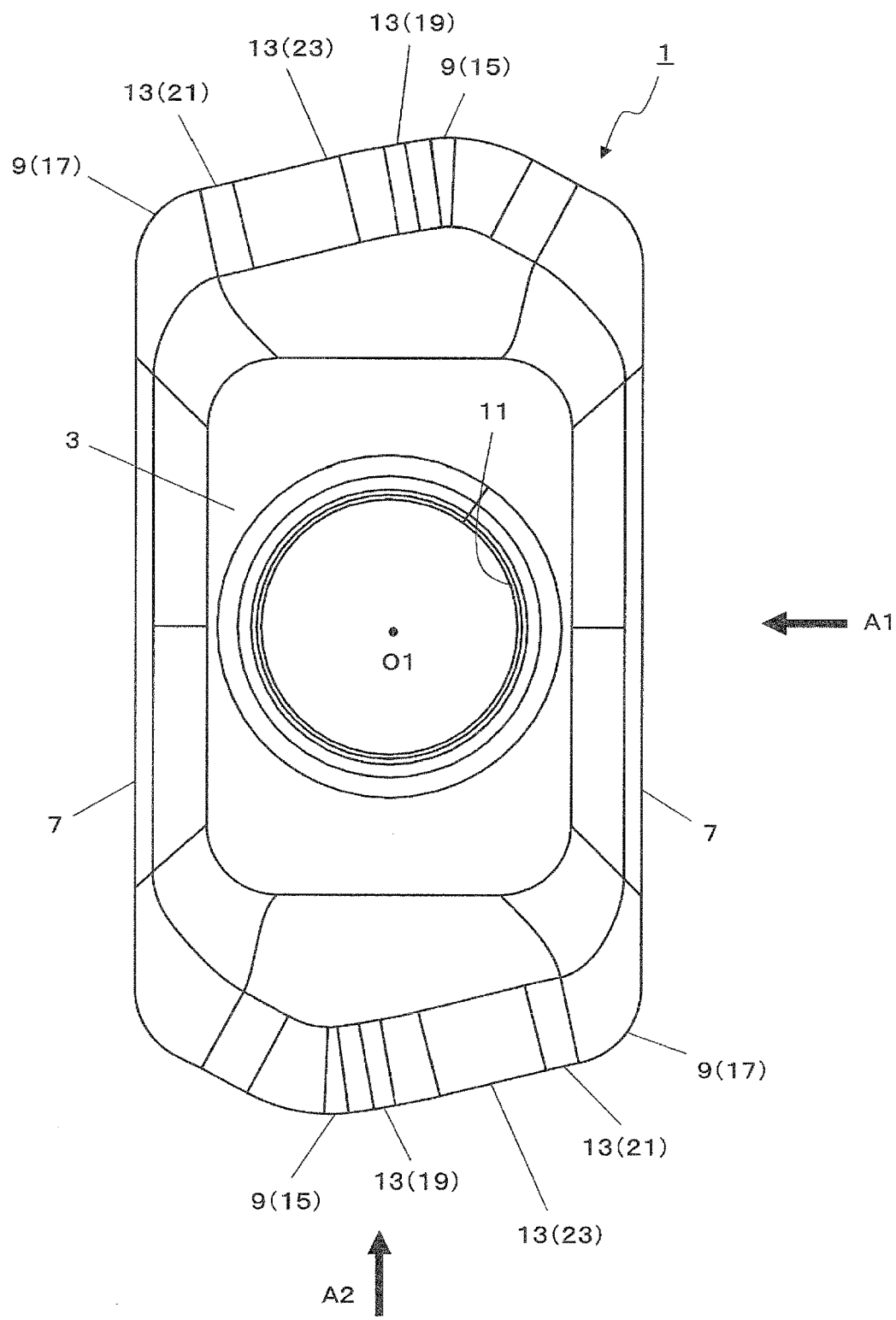
FIG. 2 is a top view of the cutting insert illustrated in FIG. 1.

The top surface 3 has a rotation-symmetrical polygonal shape and, in the present embodiment, has a hexagonal shape with a rotational symmetry of 180 degrees, as illustrated in FIG. 2. The top surface 3 that has the hexagonal shape includes two each of side portions, first corner portions, and second corner portions. The first corner portions and the second corner portions are each configured by corner portions of the top surface 3 that has the hexagonal shape. Further, the first corner portions and the second corner portions are each adjacent to the side portions. Here, the polygonal shape does not strictly refer to a shape of a polygon. For example, the first corner portions and the second corner portions of the top surface 3 of the present embodiment are not strict corners, but rather have a rounded shape when viewed from directly above.

When the insert 1 is attached to a holder, one of the first corner portions is located so as to be most separated from the rear end of the holder, and so as to protrude furthest toward a work material. In addition, the second corner portion that is adjacent, via the side portion, to the first corner portion located protruding furthest toward the work material is located on the outer periphery side so as to be most separated from a rotational axis of the holder.

The bottom surface 5 is a face located on a side opposite to the top surface 3. The bottom surface 5 functions as a seating face with an insert pocket when the insert 1 is attached to the holder. In the present embodiment, the bottom surface 5 has a hexagonal shape with a rotational symmetry of 180 degrees that corresponds to the top surface 3. Specifically, the bottom surface 5 has the hexagonal shape, as with the top surface 3. At this time, the bottom surface 5 is formed to be slightly smaller than the top surface 3.

Note that the shapes of the top surface 3 and the bottom surface 5 are not limited to those in the above-described embodiment. In the insert 1 of the present embodiment, the shapes of the top surface 3 and the bottom surface 5 are substantially hexagonal. However, the shapes of the top surface 3 and the bottom surface 5 may be a polygonal shape, such as a quadrilateral or a pentagonal shape. Further, in the present embodiment, the bottom surface 5 is formed to be slightly smaller than the top surface 3. However, the insert 1 may be formed such that the bottom surface 5 has the same shape as the top surface 3, and an outer edge of the top surface 3 and an outer edge of the bottom surface 5 overlap with each other in a top surface perspective view.

The top surface 3 and the bottom surface 5 of the present embodiment each have a rotation-symmetrical shape. When the top surface 3 and the bottom surface 5 have the rotation-symmetrical shape in this way, the center of this rotational symmetry is the center of the top surface 3 or the center of the bottom surface 5. Then, a straight line that passes through the center of the rotational symmetry of the top surface 3 and the center of the rotational symmetry of the bottom surface 5 is a central axis O1. In the present embodiment, the central axis O1 is a virtual straight line from the top surface 3 toward the bottom surface 5.

Figure 3:
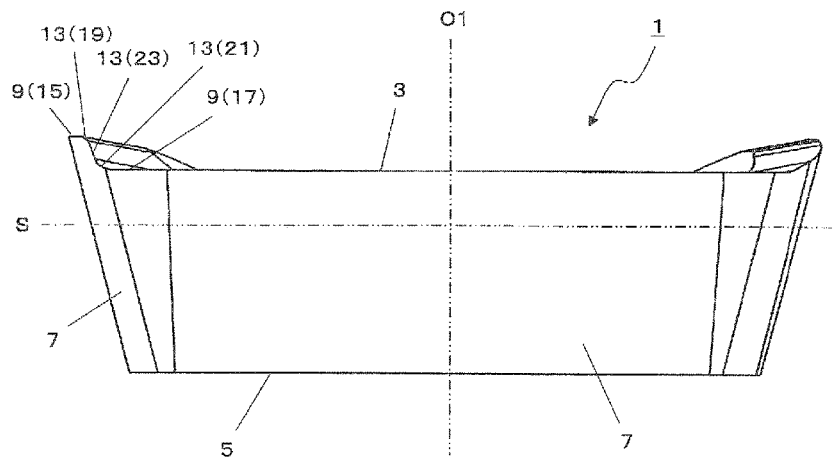
FIG. 3 is a side view from a direction A1 of the cutting insert illustrated in FIG. 2.
Figure 4:
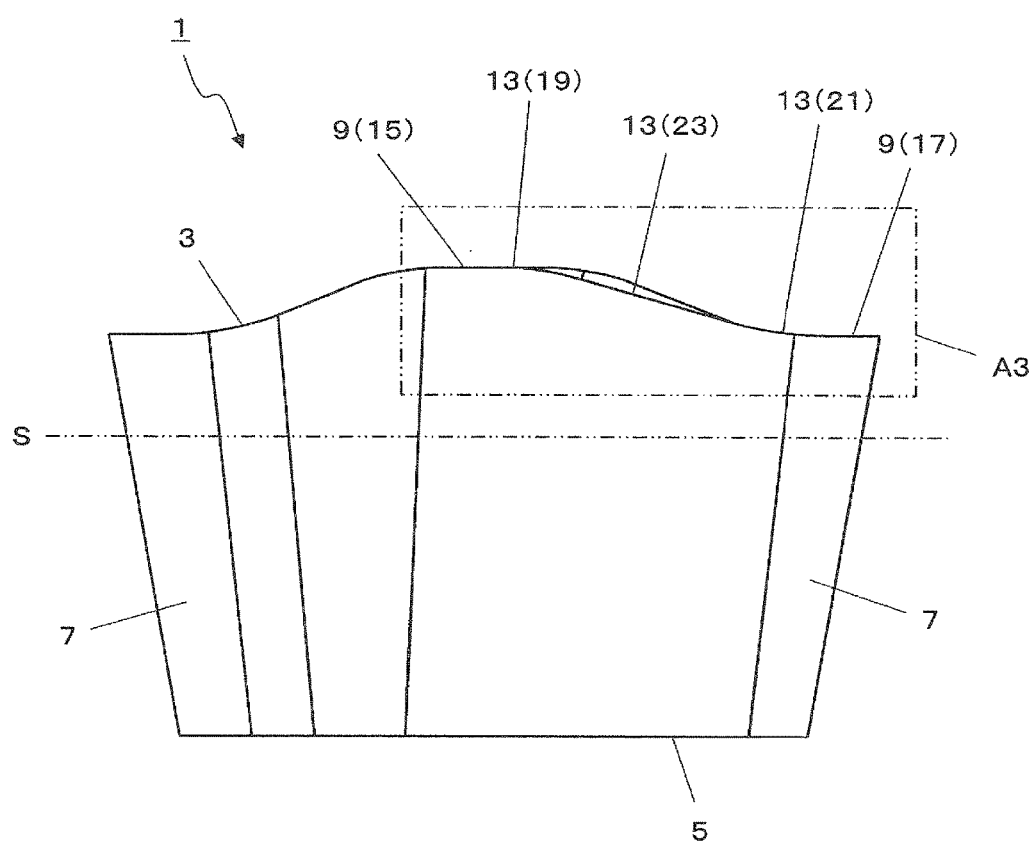
FIG. 4 is a side view from a direction A2 of the cutting insert illustrated in FIG. 2.

The central axis O1 can also be evaluated in the following manner when viewed from a side. When viewed from a side, a center point of a straight line joining both ends of the top surface 3 in a direction perpendicular to the vertical direction, namely, a straight line joining the left end and the right end of the top surface 3 in FIG. 3, is evaluated. Further, a center point of a straight line joining both ends of the bottom surface 5 in a direction perpendicular to the vertical direction, namely, a straight line joining the left end and the right ends of the bottom surface 5 in FIG. 3, is evaluated. A straight line passing through these center points matches the central axis O1.

Below, a virtual plane S that is perpendicular to the virtual straight line (the central axis O1) is set in order to evaluate the position in the vertical direction of each of the constituent components in the insert 1 of the present embodiment.

The side surfaces 7 are located between the top surface 3 and the bottom surface 5, and are connected to the top surface 3 and the bottom surface 5. As described above, the bottom surface 5 has the shape that is slightly smaller than the top surface 3, and thus, the side surfaces 7 are inclined so as to come closer to the central axis O1 from the top surface 3 side toward the bottom surface 5 side.

A maximum width of the top surface 3 when the insert 1 in the present embodiment is viewed directly from above is from 6 to 25 mm. In addition, a height from the bottom surface 5 to the top surface 3 is from 1 to 10 mm. Here, the height from the bottom surface 5 to the top surface 3 refers to a height between an upper end of the top surface 3 and a lower end of the bottom surface 5 in a direction parallel to the central axis O1. In the insert 1 of the present embodiment, the bottom surface 5 has a flat surface shape that is parallel to the virtual plane S. Thus, the height from the bottom surface 5 to the top surface 3 refers to a height between an upper end of the top surface 3 and a lower end of the bottom surface 5 in a direction parallel to the central axis O1.

The cutting edges 9 are each disposed on a part of a ridge where the top surface 3 and the side surfaces 7 intersect. The cutting edge 9 is used to cut the work material during cut processing. The regions where the top surface 3 and the side surfaces 7 intersect, where the cutting edges 9 are formed, may be subjected to a so-called honing process. That is, each of the ridges at the intersections between the top surface 3 and the side surfaces 7 need not have a strict linear shape by the intersection of the two faces. When the ridge described above has a linear shape, the strength of the cutting edge 9 may decrease. Thus, an R honing process, which causes these regions to have a curved shape, is carried out.

In the present embodiment, the cutting edges 9 include main cutting edges 13, first sub cutting edges 15 and second sub cutting edges 17. Main cutting edges 13 are located on the side portions of the top surface 3. The first sub cutting edges 15 are located at the first corner portions. More accurately, the first sub cutting edges 15 are located on the ridges on the first corner portions. The second sub cutting edges 17 are located at the second corner portions. More accurately, the second sub cutting edges 17 are located on the ridges on the second corner portions. Specifically, the insert 1 of the present embodiment includes two cutting edge groups configured by the main cutting edges 13, the first sub cutting edges 15, and the second sub cutting edges 17.

In a cutting tool using the insert 1 of the present embodiment, when the cutting edge group being used deteriorates due to prolonged cut processing, after temporarily removing the insert 1 from the holder, the insert 1 may be attached to the holder once more after rotating the insert 1 by 180 degrees around the central axis O1. In this way, the other of the unused cutting edge groups can be used in the cut processing on the work material.

The cutting edge 13 is a portion of the cutting edge 9 that is mainly used to cut a work material during cut processing. Further, as described above, when the insert 1 is attached to the holder, since the first corner portion is located so as to protrude furthest toward the work material, the portion located on the first corner portion of the cutting edge 9 is the first sub cutting edge 15 (a bottom cutting edge).

Further, since the second corner portion is located on the outer periphery side so as to be most separated from the rotational axis of the holder, the portion located on the second corner portion of the cutting edge 9 is the second sub cutting edge 17 (an outer periphery cutting edge). Thus, when the insert 1 is attached to the holder, the second sub cutting edge 17 is located further to the rear side than the first sub cutting edge 15. Further, when the insert 1 is attached to the holder, the second sub cutting edge 17 is located more separated from the rotational axis of the holder than the first sub cutting edge 15.

In the present embodiment, the first corner portions and the second corner portions each have the rounded shape when viewed from directly above. As a result, the first sub cutting edges 15 and the second sub cutting edges 17 each have the curved shape that projects outward when viewed from directly above.

In the present embodiment, the main cutting edges 13 further include first cutting edges 19, second cutting edges 21, and third cutting edges 23. Each of the first cutting edge 19, the second cutting edge 21 and the third cutting edge 23 has a linear shape when viewed from a side. The first cutting edge 19 is adjacent to the first sub cutting edge 15. The second cutting edge 21 is adjacent to the second sub cutting edge 17. Further, the third cutting edge 23 is located between the first cutting edge 19 and the second cutting edge 21. Specifically, these cutting edge portions are provided in order of the first cutting edge 19, the third cutting edge 23, and the second cutting edge 21, from a portion of the main cutting edge 13 adjacent to the first sub cutting edge 15 to a portion of the main cutting edge 13 adjacent to the second sub cutting edge 17.

The main cutting edge 13 is inclined such that the height thereof decreases from the portion adjacent to the first sub cutting edge 15 toward the portion adjacent to the second sub cutting edge 17. In this manner, since the main cutting edge 13 is inclined, the chips are inhibited from flowing toward the inside of the holder. Specifically, the chips are less likely to flow toward the rotational axis rather than toward the outer periphery side of the holder. Thus, a possibility can be reduced of the chips becoming caught between the cutting edge 9 and the machined surface of the work material during the groove machining as well.

Here, the fact that the cutting edge 13 is inclined does not mean that each of the regions of the main cutting edge 13 is inclined such that the height thereof decreases toward the second sub cutting edge 17. Specifically, this means that the main cutting edge 13 does not have regions for which the height of the portion adjacent to the first sub cutting edge 15 is higher than the height of the portion adjacent to the second sub cutting edge 17, and for which the height increases toward the second sub cutting edge 17. In other words, in parts, the main cutting edge 13 may have regions over which the height is the same toward the second sub cutting edge 17.

Then, as viewed from a side, an inclination angle $\theta 3$ of the third cutting edge 23 with respect to the virtual plane S, which is perpendicular to the central axis O1, is greater than inclination angles $\theta 1$ and $\theta 2$ of the first cutting edge 19 and the second cutting edge 21 with respect to the virtual plane S. Specifically, the value of the inclination angle $\theta 1$ of the first cutting edge 19 may be set from 0 to 10 degrees, the value of the inclination angle $\theta 2$ of the second cutting edge 21 may be set from 0 to 10 degrees, and the inclination angle $\theta 3$ of the third cutting edge 23 may be set from 5 to 25 degrees. In this way, as the main cutting edge 13 is configured by the three portions having the differing inclination angles, the whole of the main cutting edge 13 is less likely to bite into the work material simultaneously. Therefore, the occurrence of chatter vibration can be reliably decreased.

Further, because the main cutting edge 13 is not simply configured by the portions having differing inclination angles, and is configured by the above-described first cutting edge 19, second cutting edge 21, and third cutting edge 23, the cut processing can be performed in a more stable manner and the chips can also be discharged in a more stable manner.

Specifically, the inclination angle $\theta 1$ of the first cutting edge 19 that is located higher than the second cutting edge 21 and the third cutting edge 23 is relatively small. On the main cutting edge 13, since the first cutting edge 19 is in a relatively high position, when the insert 1 is used, the first cutting edge 19 is located further to the front of the rotating direction than the second cutting edge 21 and the third cutting edge 23. Thus, on the main cutting edge 13, the first cutting edge 19 bites into the work material first.

If the inclination angle $\theta 1$ of the first cutting edge 19 is large, a large load may be more easily exerted on the first sub cutting edge 15. However, since the inclination angle $\theta 1$ of the first cutting edge 19 is small, the first cutting edge 19 bites more easily into the work material over a wide range of the first cutting edge 19. Thus, the durability of the cutting edge 9 can be increased when biting into the work material. In order to increase the durability of the cutting edge 9 when biting into the work material, it is preferably that the inclination angle $\theta 1$ of the first cutting edge 19 is equal to or smaller than the inclination angle $\theta 2$ of the second cutting edge 21.

In addition, the inclination angle $\theta 3$ of the third cutting edge 23 located between the first cutting edge 19 and the second cutting edge 21 is greater than the inclination angle $\theta 1$. The third cutting edge 23 functions as a main portion of the main cutting edge 13. When the inclination angle $\theta 3$ is relatively large, the cutting resistance exerted during the cutting after biting into the work material can be reduced. As a result of the inclination angle $\theta 3$ of the third cutting edge 23 that is the main portion of the main cutting edge 13 being relatively large, the cutting resistance exerted on the main cutting edge 13 during the cutting can be effectively decreased.

Meanwhile, since the inclination angle θ3 is large, the chips may flow easily to the outer periphery side of the holder. However, in the insert 1 of the present embodiment, the main cutting edge 13 includes the second cutting edge 21, whose inclination angle θ2 is relatively small, adjacent to the second sub cutting edge 17. On the main cutting edge 13, the second cutting edge 21 is located lower than the first cutting edge 19 and the third cutting edge 23, and thus, on the main cutting edge 13, the second cutting edge 21 contributes last to the cutting of the work material.

Because the inclination angle θ2 of the second cutting edge 21 that contributes last to the cutting of the work material is smaller than the inclination angle θ3, when the chips are discharged, the discharge direction of the chips is less likely to flow excessively to the outer periphery side of the holder. Specifically, the discharge direction of the chips is more easily caused to be the opposite side to the travel direction (feed direction) of the cutting tool. As a result, the cut processing can be performed in a more stable manner, and the chips can also be discharged in a more stable manner.

Figure 5:
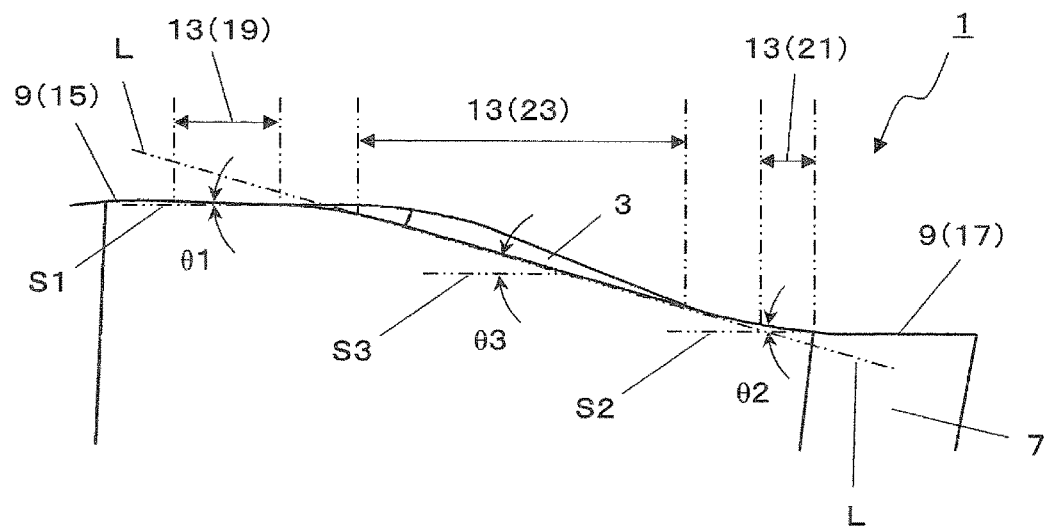
FIG. 5 is an enlarged side view of a region A3 of the cutting insert illustrated in FIG. 4.
Figure 6:
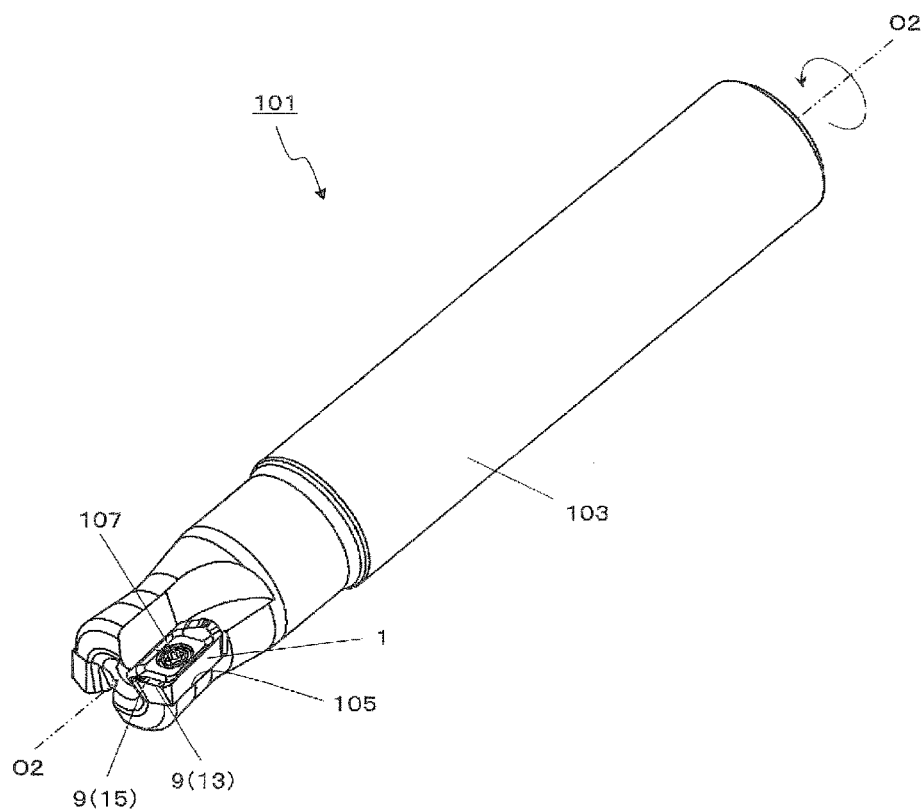
FIG. 6 is a perspective view illustrating a cutting tool of the embodiment of the present invention.
Figure 7:
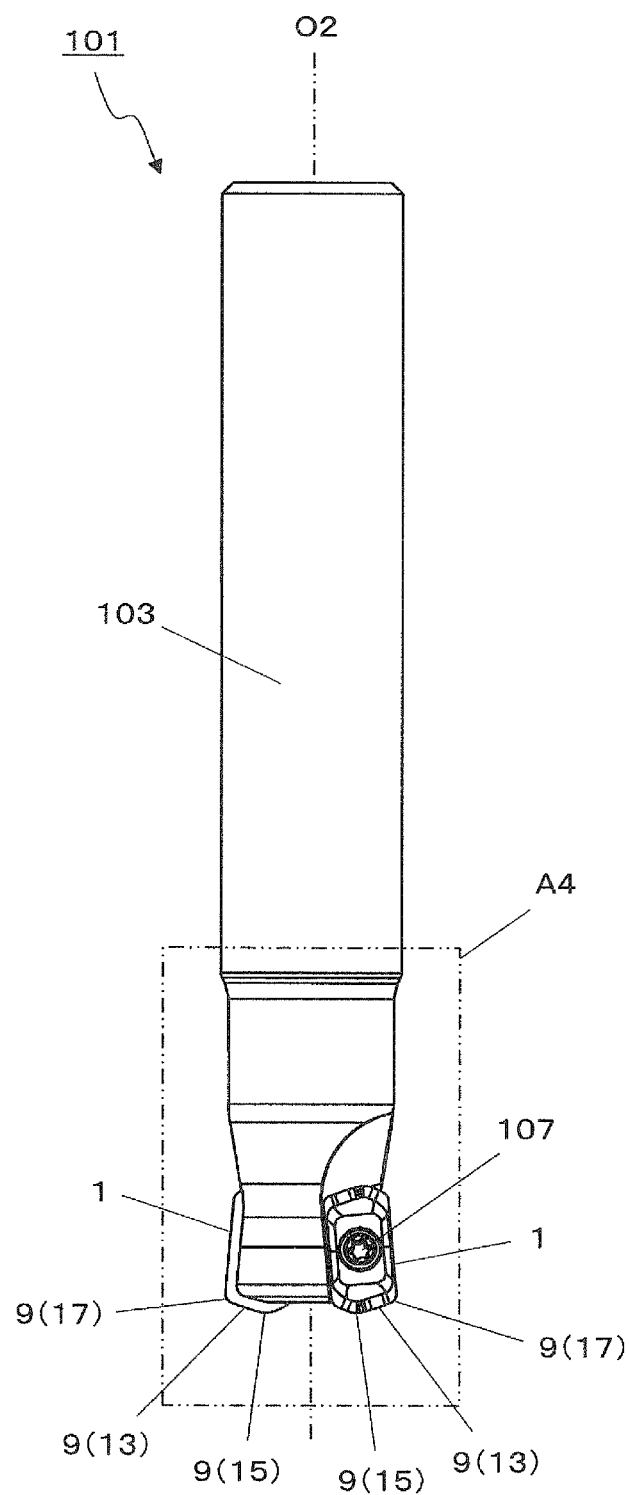
FIG. 7 is a side view of the cutting tool illustrated in FIG. 6 as viewed from a direction perpendicular to a rotational axis thereof.

Note that, in FIG. 5, in order for the inclination angles θ1, θ2, and θ3 of the first cutting edge 19, the second cutting edge 21, and the third cutting edge 23 to be easily understood, planes S1, S2, and S3 that are parallel to the virtual plane S are set, and the above-described inclination angles are illustrated by angles formed between these planes and the first cutting edge 19, the second cutting edge 21, and the third cutting edge 23.

Further, a magnitude correlation between the inclination angles θ1, θ2, and θ3 can be evaluated in the following manner. When viewed from a side, virtual extended lines L are respectively set from the third cutting edge 23 to the first cutting edge 19 side, and to the second cutting edge 21 side. At that time, when the first cutting edge 19 is located below the virtual extended line L drawn from the third cutting edge 23 to the first cutting edge 19 side, the inclination angle θ1 can be said to be smaller than the inclination angle θ3. Further, when the second cutting edge 21 is located above the virtual extended line L drawn from the third cutting edge 23 to the second cutting edge 21 side, the inclination angle θ2 can be said to be smaller than the inclination angle θ3.

In addition, the magnitude correlation between the inclination angle θ1 and the inclination angle θ2 can be evaluated by comparing an angle formed between the virtual extended line L drawn from the third cutting edge 23 and the first cutting edge 19 with an angle formed between the virtual extended line L drawn from the third cutting edge 23 and the second cutting edge 21. For example, when the angle formed between the virtual extended line L drawn from the third cutting edge 23 and the first cutting edge 19 is greater than the angle formed between the virtual extended line L drawn from the third cutting edge 23 and the second cutting edge 21, the inclination angle θ1 of the first cutting edge 19 can be said to be smaller than the inclination angle θ2 of the second cutting edge 21.

In the present embodiment, the main cutting edge 13 includes the first cutting edge 19, the second cutting edge 21, and the third cutting edge 23, but the elements configuring the main cutting edge 13 are not limited to these cutting edges. For example, in order for the first cutting edge 19 and the third cutting edge 23 that have the differing inclination angles to be smoothly connected, a curved shape connecting edge may be provided between the first cutting edge 19 and the third cutting edge 23. For the same reason, a curved shape connecting edge may be provided between the second cutting edge 21 and the third cutting edge 23. By the first cutting edge 19, the second cutting edge 21, and the third cutting edge 23 being smoothly connected by the connecting edges, a large load is less likely to be exerted on boundary portions between these cutting edges. Thus, a possibility of damage to the main cutting edge 13 can be reduced.

When viewed from a side, a length in the direction along the bottom surface 5 of the main cutting edge 13 may be set to be from 3 mm to 20 mm, for example. When viewed from a side, a length in the direction along the bottom surface 5 of the first cutting edge 19 may be set to be from 0.5 mm to 5 mm, for example. When viewed from a side, a length in the direction along the bottom surface 5 of the second cutting edge 21 may be set to be from 10 mm to 19 mm, for example. Further, when viewed from a side, a length in the direction along the bottom surface 5 of the third cutting edge 23 may be set to be from 0.5 mm to 5 mm, for example.

At that time, since the third cutting edge 23 functions as the main portion of the main cutting edge 13, when viewed from a side, the length of the third cutting edge 23 is preferably greater than the length of the first cutting edge 19 and the length of the second cutting edge 21.

Further, in order for the chips to more easily move toward the outer side of the holder, the length of the second cutting edge 21 is preferably relatively short. In other words, from the above point of view, the length of the first cutting edge 19 is preferably greater than the length of the second cutting edge 21.

Meanwhile, of the first cutting edge 19, the second cutting edge 21, and the third cutting edge 23, the first cutting edge 19 bites into the work material first. Thus, in order to reduce the load on the first cutting edge 19, the length of the first cutting edge 19 is preferably relatively short. In other words, from the above point of view, the length of the first cutting edge 19 is preferably shorter than the length of the second cutting edge 21.

In order for the chips to more easily move toward the outer side of the holder while favorably maintaining the durability of the first cutting edge 19, when viewed from a side, the length of the first cutting edge 19 and the length of the second cutting edge 21 are preferably equal to each other. At this time, the length of the first cutting edge 19 and the length of the second cutting edge 21 need not necessarily be strictly equal to each other, and it is sufficient that the length of the first cutting edge 19 be around 95 to 105% with respect to the length of the second cutting edge 21.

Cutting Tool

Next, a description will be given of a cutting tool 101 of the embodiment of the present invention with reference to FIGS. 6 to 9. FIGS. 6 to 9 illustrate a state in which the insert 1 is attached to an insert pocket 105 of the holder 103 using a screw 107. Here, the two-dot chain line in FIG. 6 indicates a rotational axis O2 of the cutting tool 101.

As illustrated in FIGS. 6 to 9, the cutting tool 101 of the present embodiment includes the rotational axis O2 and is provided with the holder 103 including a plurality of the insert pockets 105 (hereinafter simply referred to as "pockets 105") on the outer peripheral surface of the leading end side, and the inserts 1 described above, which are mounted to each of the pockets 105.

The holder 103 has a substantially cylindrical shape centered on the rotational axis O2. Then, the outer peripheral surface of the leading end side of the holder 103 is provided with the plurality of pockets 105. The pockets 105 are portions on which the inserts 1 are mounted and are open to the outer peripheral surface and the leading end surface of the holder 103. The plurality of pockets 105 may be provided at equal intervals or unequal intervals. Because the plurality of pockets 105 are formed in the holder 103, the holder 103 does not have a strictly cylindrical shape.

Then, the inserts 1 are mounted to the plurality of pockets 105 provided in the holder 103. The plurality of inserts 1 are mounted such that parts of the cutting edges 9 are in front of the leading end surface of the holder 103, that is, protrude further toward the work material than the leading end surface of the holder 103. Specifically, the plurality of inserts 1 are mounted on the holder 103 such that parts of the first sub cutting edges 15 and the main cutting edges 13 protrude from the leading end surface of the holder 103.

Figure 8:
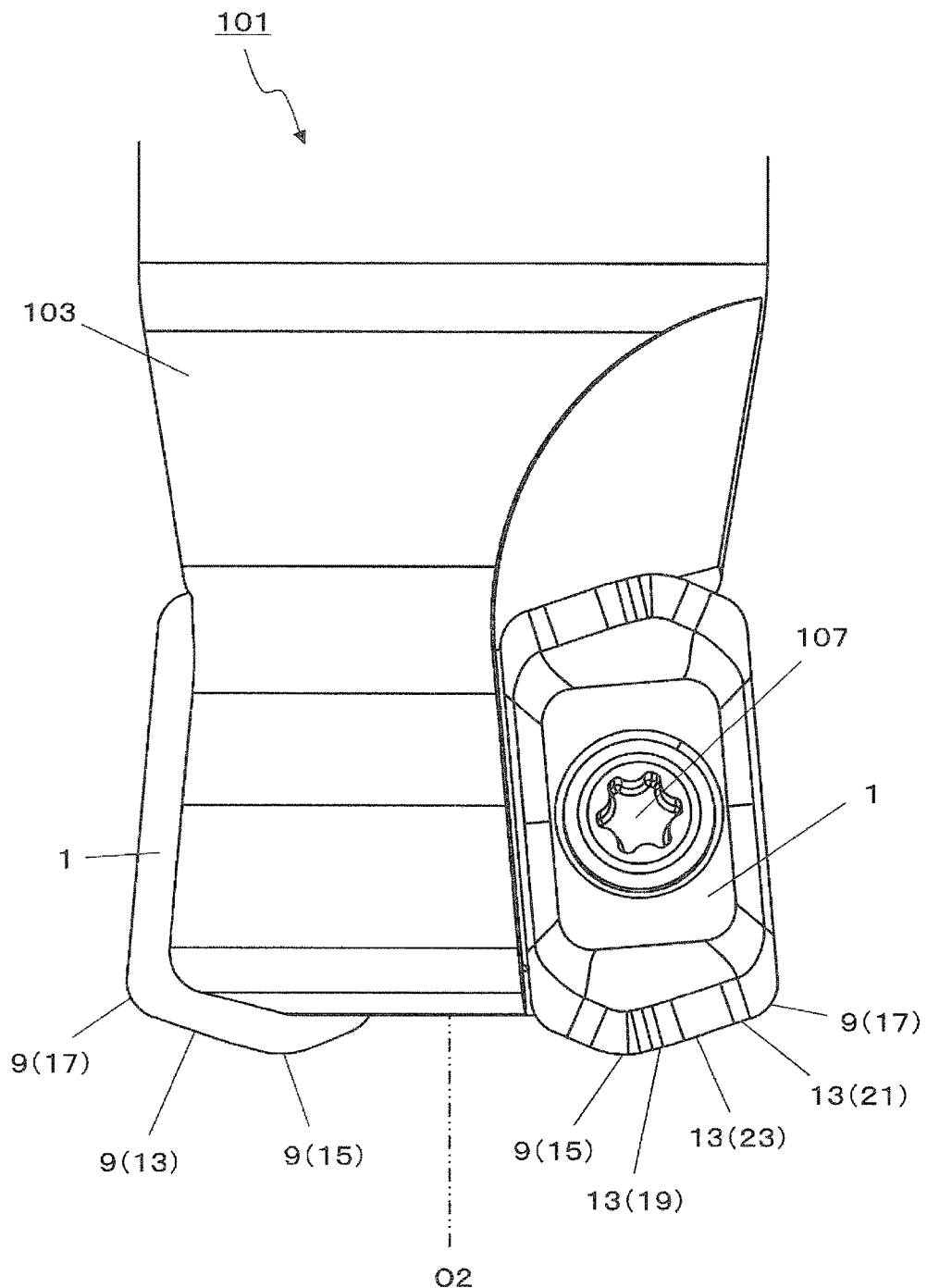
FIG. 8 is an enlarged side view of a region A4 of the cutting tool illustrated in FIG. 7.
Figure 9:
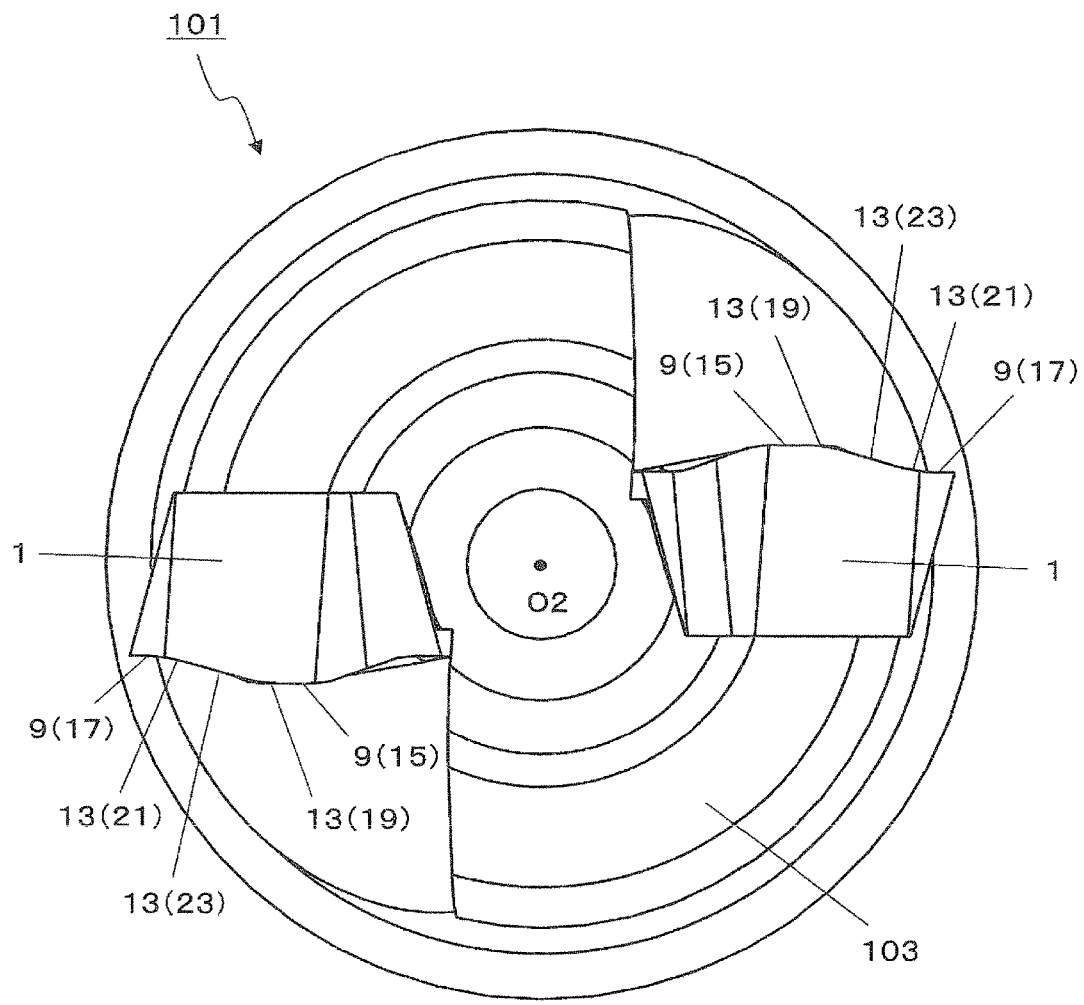
FIG. 9 is a side view of the cutting tool illustrated in FIG. 6 as viewed from a direction along the rotational axis thereof.

At this time, during the cutting, the first sub cutting edge 15 is fixed at a position protruding the furthest toward the machined surface of the work material from the leading end surface of the holder 103. As illustrated in FIG. 8, the insert 1 is mounted to the pocket 105 such that the first sub cutting edge 15 protrudes downward in FIG. 8 from the leading end surface of the holder 103. Further, the insert 1 is mounted such that the second sub cutting edge 17 is located to the outer side most separated from the rotational axis O2 of the holder 103. Therefore, the second sub cutting edge 17 can function as the outer periphery cutting edge.

In the present embodiment, the insert 1 is mounted to the pocket 105 using the screw 107. Specifically, the screw 107 is inserted into a through-hole in the insert 1 and the leading end of the screw 107 is inserted into a screw hole (not illustrated) formed in the pocket 105 such that the insert 1 is mounted on the holder 103 by fixing the screw 107 into the screw hole. Here, for the holder 103, it is possible to use steel, cast iron, or the like. In particular, it is preferable to use steel with a high toughness among these materials.

Method for Manufacturing Machined Product

Figure 10:
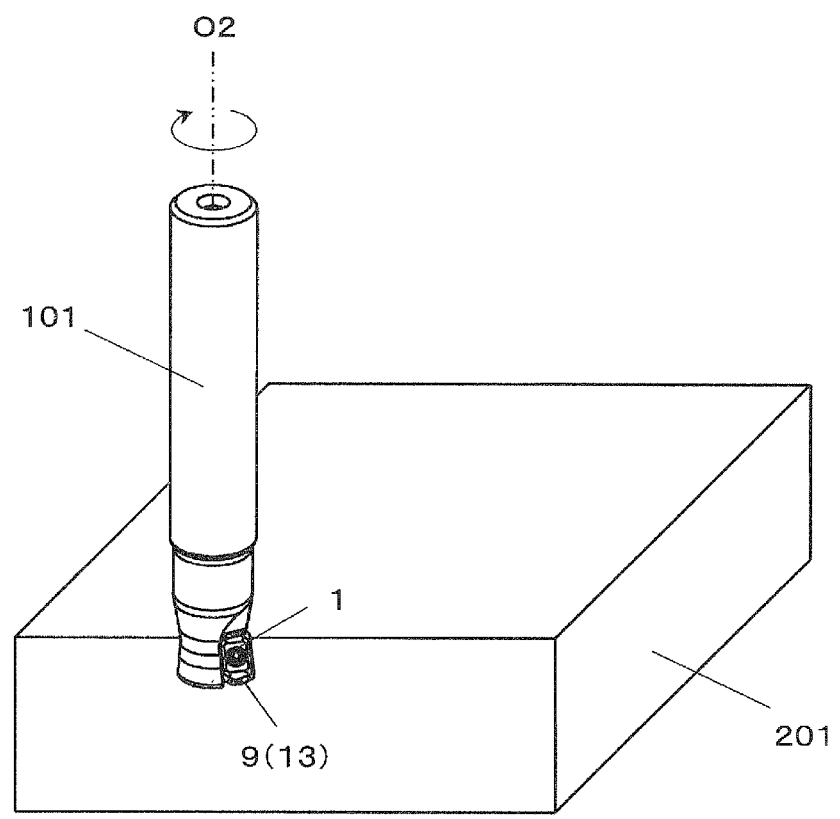
FIG. 10 is a schematic view illustrating one step of a method for manufacturing a machined product of the embodiment of the present invention.
Figure 11:
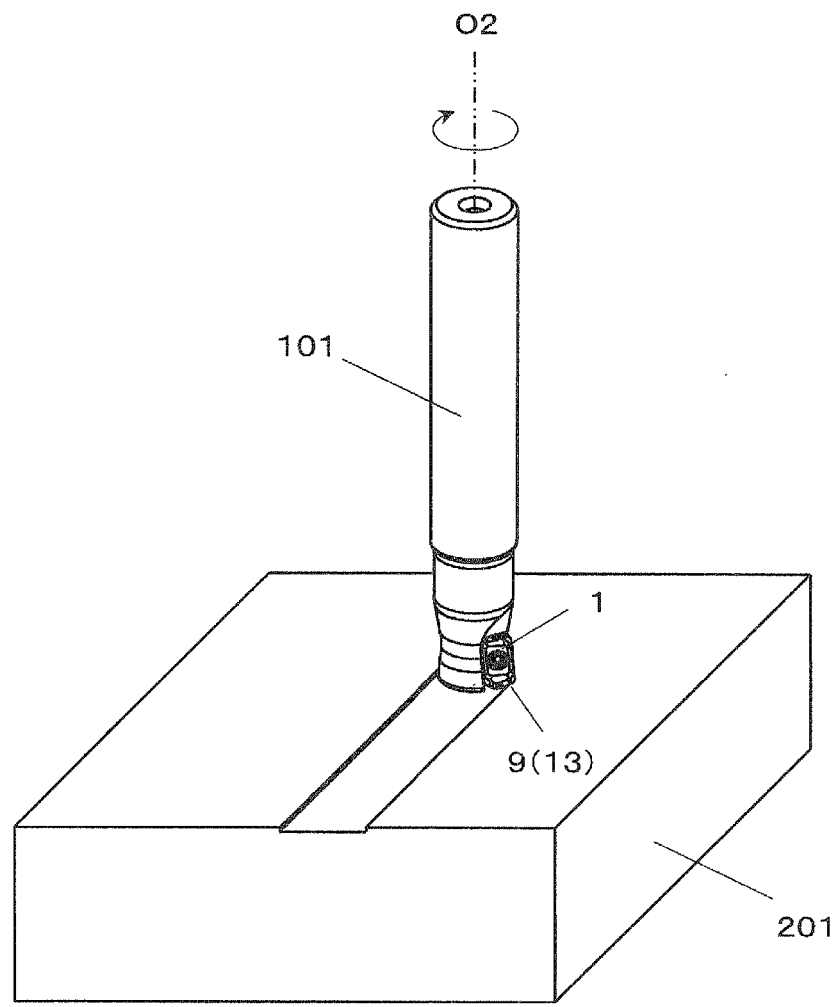
FIG. 11 is a schematic view illustrating one step of the method for manufacturing the machined product of the embodiment of the present invention.
Figure 12:
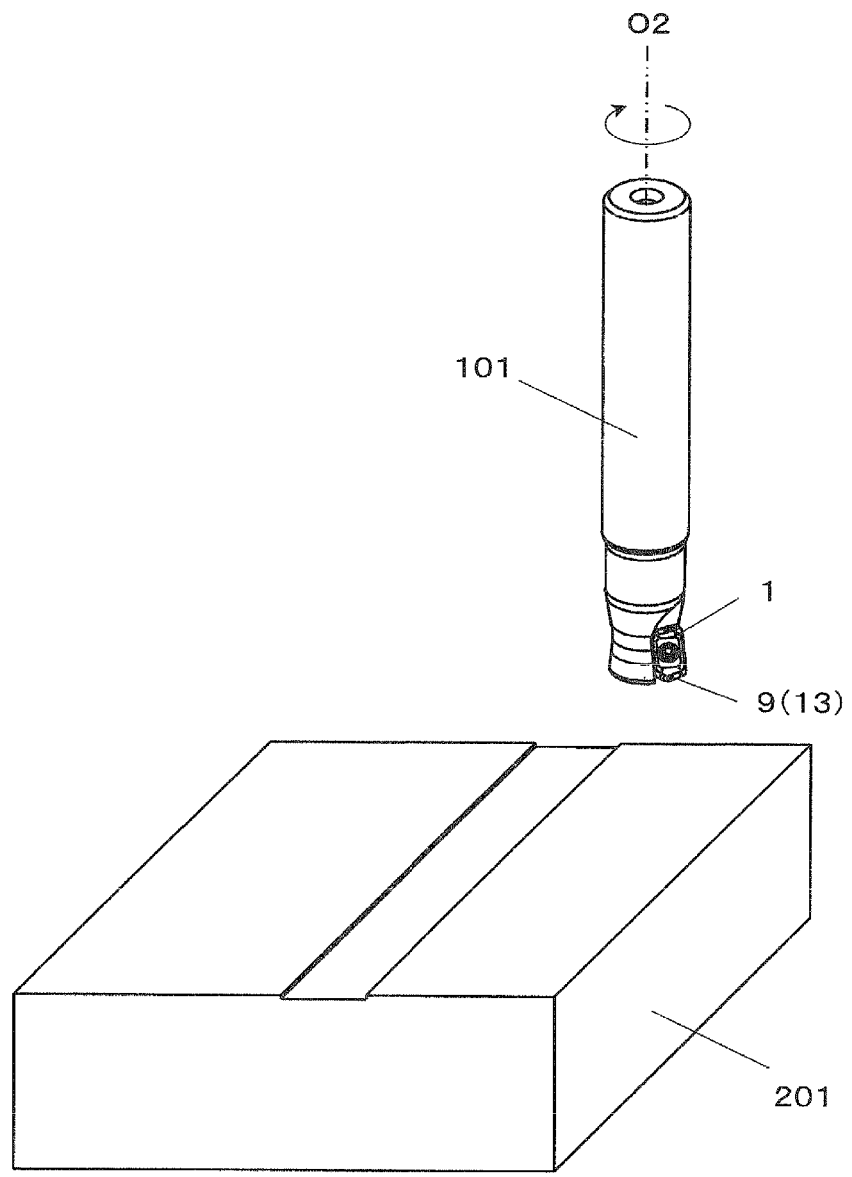
FIG. 12 is a schematic view illustrating one step of the method for manufacturing the machined product of the embodiment of the present invention.

Next, a description will be given of a method for manufacturing a machined product of the embodiment of the present invention with reference to FIGS. 10 to 12. FIGS. 10 to 12 illustrate a method for manufacturing a machined product. Here, the two-dot chain lines in FIGS. 10 to 12 indicate the rotational axis O2 of the cutting tool 101. The machined product is manufactured by cut processing a work material 201. The cutting method of the present embodiment is provided with the following steps. Specifically, the steps of:

(1) rotating the cutting tool 101 exemplified by the above-mentioned embodiment;

(2) bringing the main cutting edge 13 of the rotating cutting tool 101 into contact with the work material 201; and (3) separating the cutting tool 101 from the work material 201.

More specifically, first, the cutting tool 101 is brought relatively close to the work material 201 while being rotated around the rotational axis O2. Next, as illustrated in FIG. 11, the main cutting edge 13 of the cutting tool 101 is brought into contact with the work material 201 and cuts the work material 201. Next, as illustrated in FIG. 12, the cutting tool 101 is relatively moved away from the work material 201.

In the present embodiment, the work material 201 is fixed and the cutting tool 101 is brought close to the work material 201. In addition, in FIGS. 10 to 12, the work material 201 is fixed and the cutting tool 101 is rotated about the rotational axis O2. In addition, in FIG. 12, the work material 201 is fixed and the cutting tool 101 is moved away from the work material 201. Here, in the cut processing in the manufacturing method of the present embodiment, in each of these steps, the work material 201 is fixed and the cutting tool 101 is moved, but the present embodiment is of course not limited thereto.

For example, in step (1), the work material 201 may be brought close to the cutting tool 101. In the same manner, in step (3), the work material 201 may be moved away from the cutting tool 101. In a case where the cut processing is to be continued, steps of bringing the main cutting edge 13 of the insert 1 into contact with different places on the work material 201 may be repeated while maintaining the rotating state of the cutting tool 101. When the main cutting edge 13 being used is worn, an unused main cutting edge 13 may be used by rotating the insert 1 180 degrees with respect to the central axis of the through-hole. Here, representative examples of the material of the work material 201 include carbon steel, alloy steel, stainless steel, cast iron, non-ferrous metals, or the like.

REFERENCE SIGNS LIST

1 Cutting insert (Insert)
3 Top surface
5 Bottom surface
7 Side surface
9 Cutting edge
11 Through-hole
13 Main cutting edge
15 First sub cutting edge
17 Second sub cutting edge
19 First cutting edge
21 Second cutting edge
23 Third cutting edge
101 Cutting tool
103 Holder
105 Insert pocket (pocket)
107 Screw
201 Work material
O1 Central axis
O2 Rotational axis
S, S1, S2, S3 Virtual plane
θ1, θ2, θ3 Inclination angle

The invention claimed is:

1. A cutting insert comprising:
a top surface comprising a side portion, and a first corner portion and a second corner portion each adjacent to the side portion;
a bottom surface opposite to the top surface;
a side surface located between the top surface and the bottom surface; and
a cutting edge disposed along a ridge line at an intersection between the top surface and the side surface,
wherein
the cutting edge comprises:
    a main cutting edge located on the side portion;
    a first sub cutting edge located on the first corner portion; and
    a second sub cutting edge located on the second corner portion, the main cutting edge comprises in a side view:
    a first cutting edge is connected to the first sub cutting edge;
    a second cutting edge is connected to the second sub cutting edge; and
    a third cutting edge having a linear shape and located between the first cutting edge and the second cutting edge,
the main cutting edge inclines with a height thereof decreasing from a portion adjacent to the first sub cutting edge to a portion adjacent to the second sub cutting edge in a side view, and an inclination angle of the third cutting edge is greater than inclination angles of the first cutting edge and the second cutting edge in a side view.

2. The cutting insert according to claim 1, wherein, the inclination angle of the first cutting edge is not greater than the inclination angle of the second cutting edge in a side view.

3. The cutting insert according to claim 1, wherein, a length of the third cutting edge is greater than a length of the first cutting edge and a length of the second cutting edge in a side view.

4. The cutting insert according to claim 3, wherein, the length of the first cutting edge is greater than the length of the second cutting edge in a side view.

5. The cutting insert according to claim 3, wherein, the length of the first cutting edge is equal to the length of the second cutting edge in a side view.

6. The cutting insert according to claim 1, wherein
the main cutting edge further comprises:
a fourth cutting edge having a curved shape; and
a fifth cutting edge having curved shape, and
the first cutting edge and the third cutting edge are connected by the fourth cutting edge, and the second cutting edge and the third cutting edge are connected by the fifth cutting edge.

7. A cutting tool comprising:
a holder comprising an insert pocket on a front end thereof; and
the cutting insert according to claim 1 mounted to the insert pocket with the main cutting edge protruding from the holder.

8. A method for manufacturing a machined product, the method
comprising:
rotating the cutting tool according to claim 7;
bringing the main cutting edge of the cutting tool that is rotating into contact with a work material; and
separating the cutting tool from the work material.

9. A cutting insert comprising:
a top surface comprising a side portion, and a first corner portion and a second corner portion each adjacent to the side portion;
a bottom surface opposite to the top surface;
a side surface located between the top surface and the bottom surface; and
a cutting edge disposed along a ridge line at an intersection between the top surface and the side surface,
wherein
the cutting edge comprises:
a main cutting edge located on the side portion;
a first sub cutting edge located on the first corner portion; and
a second sub cutting edge located on the second corner portion,
the main cutting edge comprises in a side view:
a first cutting edge is connected to the first sub cutting edge;
a second cutting edge is connected to the second sub cutting edge; and
a third cutting edge having a linear shape and located between the first cutting edge and the second cutting edge, and
the main cutting edge inclines in a direction of the bottom surface from a side of the first cutting edge to a side of the second cutting edge, and an inclination angle of the third cutting edge is greater than inclination angles of the first cutting edge and the second cutting edge in a side view.

10. The cutting insert according to claim 1, wherein, each of the first cutting edge and the second cutting edge has a linear shape.

11. A cutting insert comprising:
a top surface comprising a side portion, and a first corner portion and a second corner portion each adjacent to the side portion;
a bottom surface opposite to the top surface;
a side surface located between the top surface and the bottom surface; and
a cutting edge disposed along a ridge line at an intersection between the top surface and the side surface,
wherein
the cutting edge comprises:
a main cutting edge located on the side portion;
a first sub cutting edge located on the first corner portion; and
a second sub cutting edge located on the second corner portion, the main cutting edge comprises in a side view:
a first end connected to the first sub cutting edge;
a second end connected to the second sub cutting edge;
a first cutting edge extending from the first end toward the second sub cutting edge;
a second cutting edge extending from the second end toward the first sub cutting edge; and
a third cutting edge having a linear shape and located between the first cutting edge and the second cutting edge,
the main cutting edge inclines with a height thereof decreasing from the first end to the second end in a side view,
the second end is closer to the bottom surface than the first end, and
an inclination angle of the third cutting edge is greater than inclination angles of the first cutting edge and the second cutting edge in a side view.

12. The cutting insert according to claim 11, wherein, each of the first cutting edge and the second cutting edge has a linear shape.

13. The cutting insert according to claim 11, wherein, the inclination angle of the first cutting edge is not greater than the inclination angle of the second cutting edge in a side view.

14. The cutting insert according to claim 11, wherein, a length of the third cutting edge is greater than a length of the first cutting edge and a length of the second cutting edge in a side view.

15. The cutting insert according to claim 14, wherein, the length of the first cutting edge is greater than the length of the second cutting edge in a side view.

16. The cutting insert according to claim 14, wherein, the length of the first cutting edge is equal to the length of the second cutting edge in a side view.

17. The cutting insert according to claim 11, wherein
the main cutting edge further comprises:
a fourth cutting edge having a curved shape; and
a fifth cutting edge having curved shape, and
the first cutting edge and the third cutting edge are connected by the fourth cutting edge, and the second cutting edge and the third cutting edge are connected by the fifth cutting edge.

* * * * *